United States Patent
Wennstrom

[15] 3,650,553
[45] Mar. 21, 1972

[54] PILE CONNECTING DEVICES

[72] Inventor: Elof Algot Wennstrom, Orebro, Sweden
[73] Assignee: AB Jarnforadling, Halleforsnas, Sweden
[22] Filed: Mar. 30, 1970
[21] Appl. No.: 23,840

[30] Foreign Application Priority Data

Mar. 28, 1969 Sweden..............................4366/69

[52] U.S. Cl. ............................287/130, 61/53, 287/103 R
[51] Int. Cl. ......................................................F16b 7/00
[58] Field of Search..................287/130, 108, 129, 20.92 G, 287/103 R; 61/53

[56] References Cited

UNITED STATES PATENTS

| | | | |
|---|---|---|---|
| 1,261,278 | 4/1918 | Onderkirk | 287/130 |
| 1,469,527 | 10/1923 | Onderkirk | 287/130 |
| 3,346,285 | 10/1967 | Miaskiewicz, Sr. | 287/129 X |
| 3,356,398 | 12/1967 | Nilsson et al | 61/53 X |
| 3,104,532 | 9/1963 | Severinsson | 287/103 R X |

Primary Examiner—Andrew V. Kundrat
Attorney—Ralph E. Bucknam, Jesse D. Reingold, Robert R. Strack and Henry A. Marzullo, Jr.

[57] ABSTRACT

A pile connecting device comprises two plate-shaped members which are adapted for connection with the ends of two pile sections to be joined together and which in the connecting position snugly engage one another by means of planar surfaces. These planar surfaces are provided with registering grooves which extend inwardly from the edges of the plate members and are of dove-tailed cross section, the grooves accommodating locking wedges of double dove-tail configuration in cross section. At their inner ends the wedges have projections which shall cooperate with curved recesses at the inner ends of the grooves. As a result, the wedges when driven into the grooves will be reliably anchored to the plate-shaped members.

7 Claims, 8 Drawing Figures

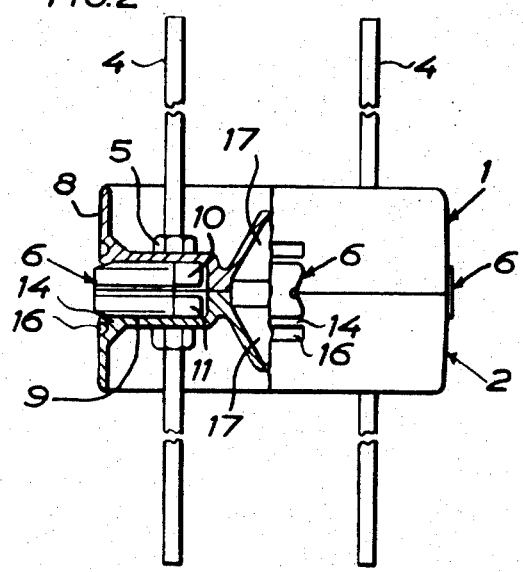
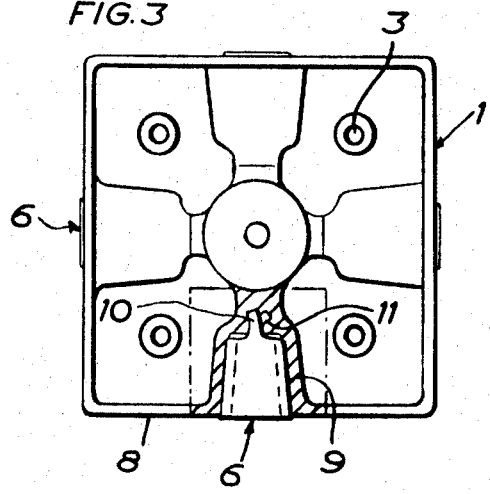

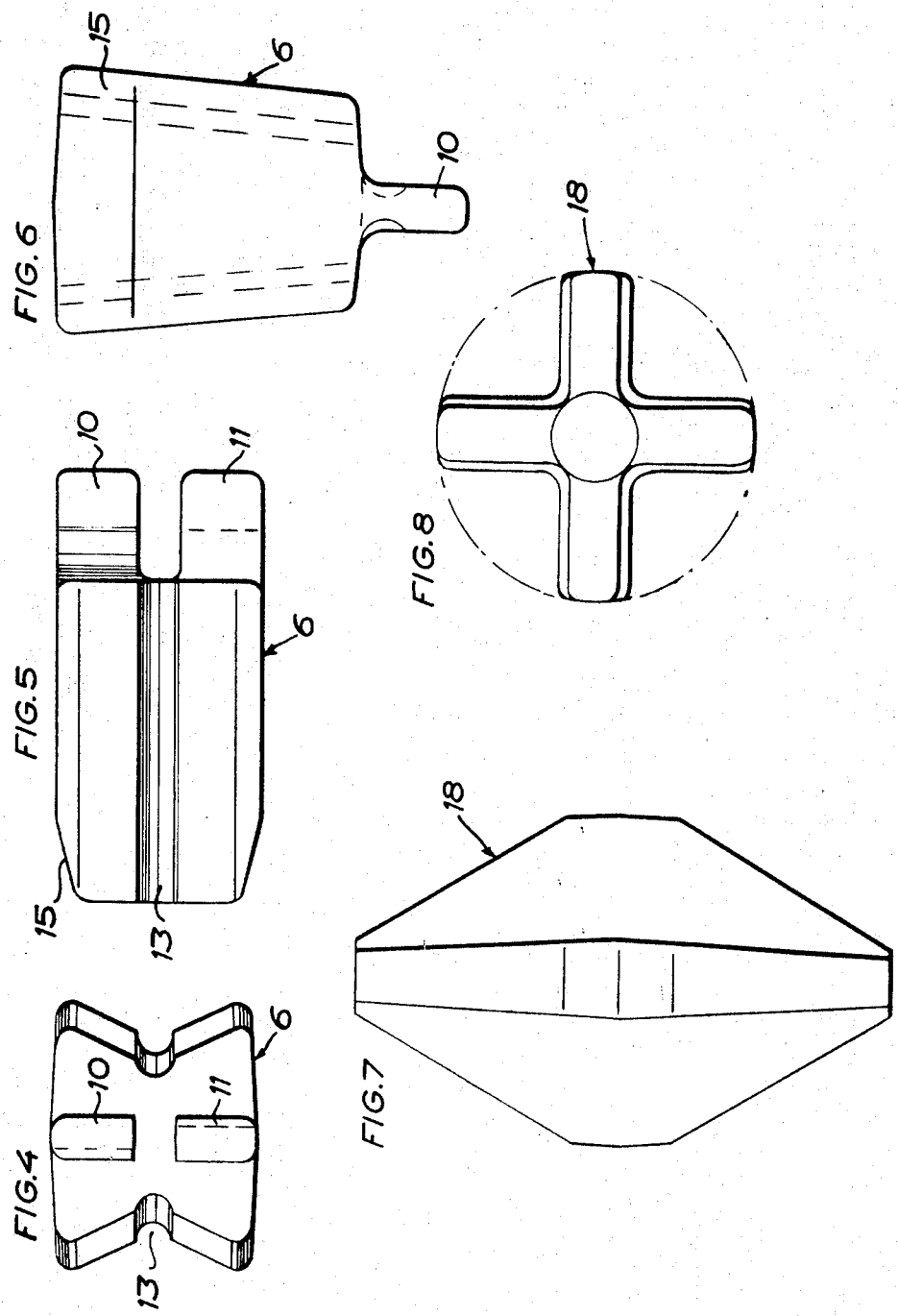

PILE CONNECTING DEVICES

This invention relates to a pile connecting device comprising two plate-shaped members which are adapted for connection with the ends of two pile sections to be joined together and which in the connecting position snugly engage one another by means of planar surfaces, which are provided with a number of registering grooves extending inwardly from the edges of the plate members and being of dove-tailed cross section, each pair of registering grooves accommodating a locking wedge of double dovetail configuration in cross section. Characteristic of the invention is that at the inner ends the wedges have integral projections which are to cooperate with curved recesses at the inner ends of the grooves in the plate members so that the wedges when driven into the grooves will be reliably anchored to the plate members. The pile connecting device of the present invention altogether eliminates the risk of the wedges coming loose and sliding out of the grooves, which is of the utmost importance from the point of view of solidity.

The invention will be more fully described with reference to the accompanying drawings which illustrate a preferred embodiment of the pile connecting device.

In the drawings:

FIG. 2 is a side view, partly in section, of the device in the mounted position thereof;

FIG. 3 is a plan view, partly in section, of the device;

FIGS. 4–6 are views on a larger scale of a locking wedge of the pile connecting device, as seen from three directions at right angles to each other;

FIGS. 7 and 8 are views on the same scale of a centering pin of the pile connecting device, as seen from two directions at right angles to one another.

Figure 1:
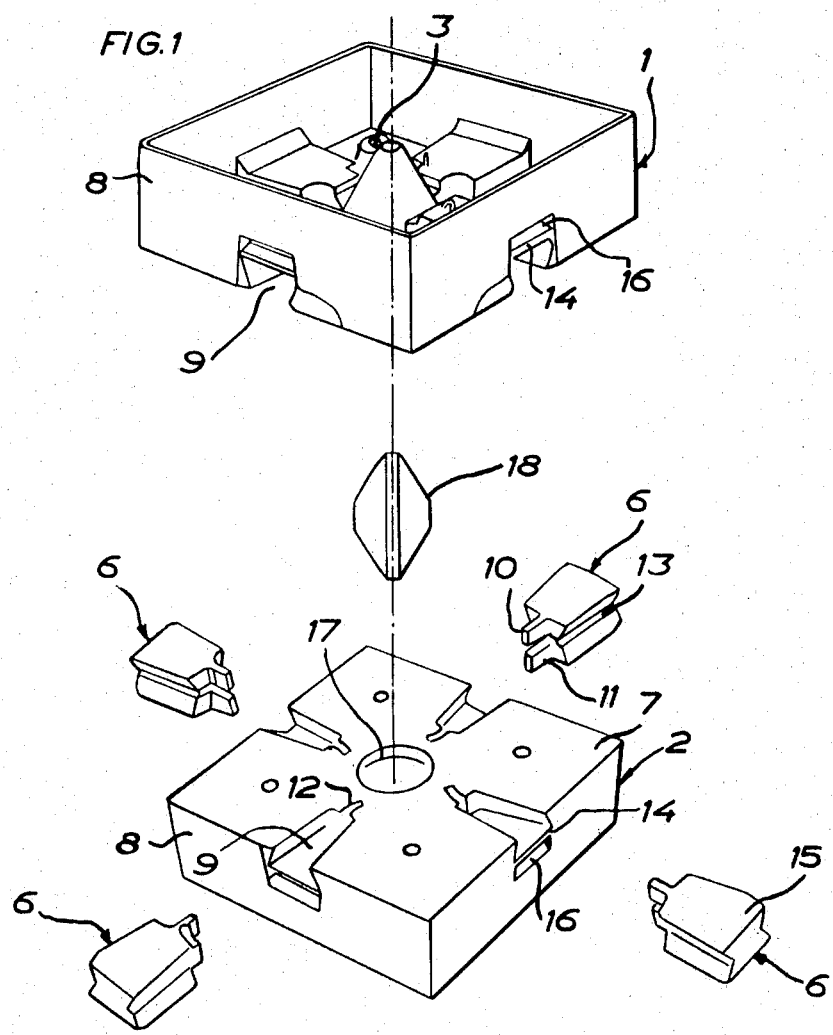
FIG. 1 is an exploded perspective view of the constituent parts of the pile connecting device.

The pile connecting device comprises two plate-shaped members 1 and 2 which are intended for connection with the ends of two pile sections to be joined together. The pile sections consist particularly of reinforced concrete, for which reason the plates 1 and 2 have fastenings 3 for reinforcing rods 4. These rods 4 could be welded to the plates 1 and 2, but in the preferred embodiment illustrated the fastenings 3 are in the form of threaded holes into which the rods 4 are threaded and secured by locking nuts 5.

The plates 1 and 2 are identical, square in the preferred embodiment, and arranged to be kept together by four locking wedges 6. However, the plates 1 and 2 may also be of different shape, e.g., circular. Of course, the number of the wedges 6 may also be varied.

In the connecting position the plates 1 and 2 are to snugly engage each other by means of planar surfaces 7. These planar surfaces 7 have a number of registering inwardly tapering grooves 9 which extend inwardly from the edges 8 of the plates 1, 2 and are of substantially dove-tailed cross section. Each pair of registering grooves 9 is to accommodate a locking wedge 6 which in cross section has the form of a double dovetail and which like the grooves 9 is of a width diminishing towards the inner end.

According to the invention, the wedges 6 are provided at their inner ends with integral projections 10 and 11 which cooperate with curved recesses at the inner ends of the grooves 9 in the plates 1 and 2. When the wedges 6 are driven into the grooves 9, the projections 10 and 11 will be bent in the recesses 12, which ensures a reliable anchoring of the wedges 6 in the positions to which they have been driven.

Each of the wedges 6 is provided at the inner end with two projections 10, 11 which are to cooperate with oppositely bent recesses 12 at the inner ends of the grooves 9 in the plates 1 and 2. The recesses 12 might be bent in the direction of the pile. In the preferred embodiment illustrated, however, the recesses 12 at the inner ends of the grooves 9 are bent towards the edges 8 of the plates 1 and 2. As a result of this and because the projections 10, 11 are formed by two wing-like portions lying one above the other in the central plane of the wedge 6, an anchoring is obtained which is well suited to take up forces arising when the pile is driven into the ground. At the driving of the pile the plates 1 and 2 tend to move apart, which is counteracted by the projections 10 and 11 which are placed on edge and reach up to the lateral surfaces.

As is best seen from FIG. 5, the two wing-like projections 10 and 11 which are located one above the other in the central plane of the wedge 6 are spaced apart at the transition 13 between the dove-tails. As a result, the projections 10, 11 will not engage the surfaces 7 of the plates 1 and 2 at the pile driving, which will further spare the projections 10 and 11 only frictionally engaged in the grooves 9.

At the edges 8 the plates 1 and 2 are provided, in the grooves 9 inwardly extending from said edges, with deformable portions 14 intended to engage the outer end portions 15 of the wedges 6 to anchor them in the positions to which they have been driven. As appears from FIGS. 1 and 2, each of the deformable portions 14 is defined by a recess 16 located inwardly of the grooves 9.

The outer end portions 15 of the wedges 6 slightly taper towards the outer ends, and the deformable portions 14 are meant to coact with said end portions 15, as appears from FIG. 2.

The pile connecting device has centering means. In the embodiment illustrated, the centering means comprises a double cone 18 and conical recesses 17 formed in the two plates 1 and 2, in which the double cone 18 is to engage. The double cone 18 in cross section has the shape of a cross, as is best seen from FIG. 8, where it is inscribed in a circle. The centering means, however, may also be of another configuration. In certain cases, it is desired that the plates 1 and 2 shall have central holes for checking purposes, and the centering means of course should then be located laterally of these central holes. The centering means may comprise a number of projections and conforming recesses in the plates 1 and 2, the recesses being so arranged that the plates 1 and 2 are identical. The centering means could also be a separate device which is released from the pile connecting device after the pile sections have been brought together.

In the embodiment illustrated the plates 1 and 2, the wedges 6 and the double cone 18 are castings, but other materials are also conceivable.

What I claim and desire to secure by Letters Patent is:

1. A pile connecting device comprising two plate-shaped members which are adapted for connection with the ends of two pile sections to be joined together and which in the connecting position snugly engage one another by means of planar surfaces which are provided with a number of registering grooves extending inwardly from the edges of the plate members and being of dove-tailed cross section, each pair of registering grooves having a locking wedge of double dovetail configuration in cross section, wherein at the inner ends the wedges have integral projections which cooperate with curved recesses at the inner ends of the grooves in the plate members so that the wedges when driven into the grooves have their projections deformed and are anchored to the plate members.

2. A pile connecting device as claimed in claim 1, wherein each of the wedges is provided at the inner end with two projections adapted for coaction with oppositely bent recesses at the inner ends of the grooves in the plate members.

3. A pile connecting device as claimed in claim 2, wherein the projections are formed by two wing-like portions lying one above the other in the central plane of the wedge, and at the inner ends of the grooves the recesses are bent towards the edges of the plate members.

4. A pile connecting device as claimed in claim 3, wherein the two wing-like projections lying one above the other in the central plane of the wedge are spaced apart at the transition between the dove-tails.

5. A pile connecting device as claimed in claim 1, wherein at the edges and in the grooves extending inwardly from said edges the plate members are provided with deformable portions for engagement with the outer end portions of the wedges to anchor said wedges in the positions into which they have been driven.

6. A pile connecting device as claimed in claim 5, wherein each of the deformable portions is defined by a recess located inwardly of the groove.

7. A pile connecting device as claimed in claim 5, wherein the outer end portions of the wedges slightly taper towards the outer ends, the deformable portions of the plate members being intended for coaction with the tapering outer end portions of the wedges.

* * * * *